United States Patent [19]

Franklin

[11] Patent Number: 4,982,490
[45] Date of Patent: Jan. 8, 1991

[54] METHOD OF LINING A FLUID CONDUIT

[75] Inventor: Hunter M. Franklin, Aldershot, England

[73] Assignees: Stephen Tracey, Aldershot; Stanley Robert Moore, Grayshot, both of England

[21] Appl. No.: 71,467

[22] Filed: Jul. 9, 1987

[30] Foreign Application Priority Data

Jul. 11, 1986 [GB] United Kingdom ................. 8616898
Jul. 11, 1986 [GB] United Kingdom ................. 8616899

[51] Int. Cl.$^5$ .......................... E03F 3/04; F16L 55/18
[52] U.S. Cl. ....................................... 29/407; 29/523; 83/184; 83/195; 138/98; 264/269
[58] Field of Search ...................... 29/407, 523; 138/97, 138/98; 83/184, , 195, 178; 324/67, 220, 221; 33/21.3, 529, 1 H, DIG. 1; 116/204, 307; 264/36, 269

[56] References Cited

FOREIGN PATENT DOCUMENTS 2041147 9/1980 United Kingdom ................. 138/98

Primary Examiner—Joseph M. Gorski

[57] ABSTRACT

A method of lining a main fluid conduit 1 having a branch conduit 2 and apparatus for use in the main conduit includes a carrier 7 which is longitudinally displacable in the conduit 1. A portion 9 of the carrier is rotatable above a longitudinal axis and carries a scissors-type extendible linkage 10 having a platform 11. By rotation of the portion 9, displacement of the carrier 7, and extension of the linkage 10, service structure on the platform 11 can be maneuvered to be located in the branch conduit 2. The service structure may be a water jet cutter or a locating member 15 having a chamber which is expandible by fluid pressure to engage the sides of the conduit 2 and be retained therein. The locating member 15 includes a metallic part which a metal detector can detect through a lining which is fitted in the main conduit 1 to determine the position at which a port has to be cut in the lining to coincide with the branch conduit 2. Preferably the chamber of the of the locating member 15 is expanded by fluid pressure through a hose 20 and non-return valve so that the hose 20 disengages automatically at a predetermine pressure to isolate the locating member in the conduit 2 when the platform 11 is withdrawn.

9 Claims, 3 Drawing Sheets

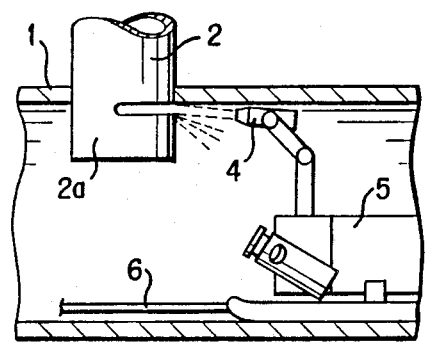
FIG. 1
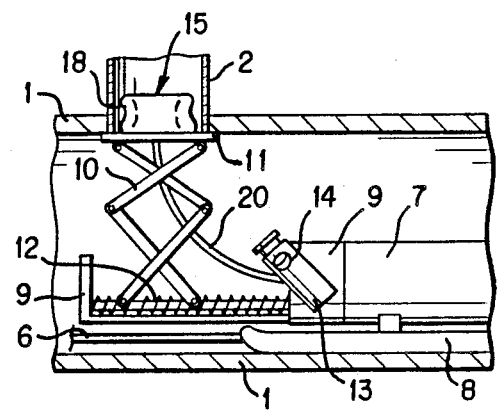
FIG. 2
FIG. 3
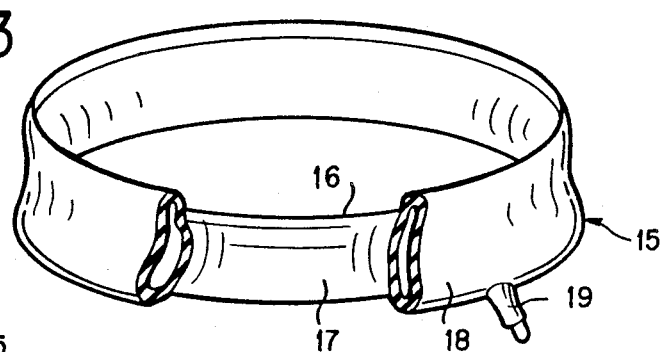
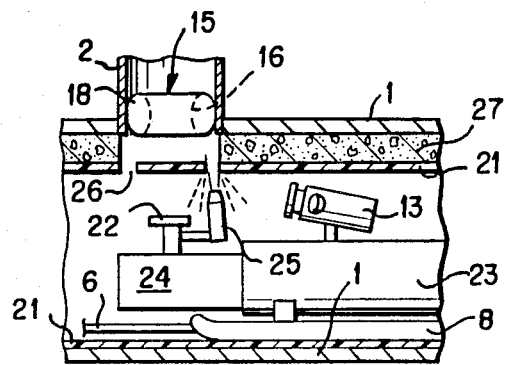
FIG. 4

METHOD OF LINING A FLUID CONDUIT

TECHNICAL FIELD & BACKGROUND ART

The present invention relates to a method of lining a fluid conduit, apparatus for use in such a method, and a carrier which is displaceable within a fluid conduit for servicing purposes therein. The invention was primarily developed for lining, with a tubular liner, a main fluid conduit (such as a sewer, water, gas or other fluid pipe) having a branch conduit or pipe extending therefrom. The tubular liner will usually be a plastics pipe which is pulled through the main fluid conduit. With the liner positioned in the main fluid conduit it is necessary to form ports in the liner by cutting through the wall thereof at positions which coincide with respective branch conduits or pipes so that fluid flow is permissible between the branch conduit and the bore of the liner. The cutting of a port in the liner may be achieved by a water jet cutting device mounted on a carrier within the liner in accordance with the disclosure in our British Pat. No. 2,098,300B. Prior to the ports being cut, it is of course necessary to locate, with reasonable accuracy, the respective openings from the main fluid conduit to the branch conduits or pipes so that when the ports are cut they will substantially coincide with their respective branch conduits. With relatively thick walled and substantially rigid plastics liners it will be appreciated that location of an appropriate position for a port visually (for example, by use of a television camera mounted on a carrier within the liner) cannot be relied on. As a consequence, prior proposals to locate the position at which a port should be cut in the liner for a buried sewer pipe include excavation techniques where a branch conduit is broken open to mark the wall of the liner through the opening of the branch conduit so that such marking is detectable from the interior of the liner and subsequently repairing the branch conduit. A further proposal is to position a radioactive source in the branch conduit, either by excavating and breaking through the wall of the branch conduit or by maneuvering the source through the branch conduit from the end thereof remote from the main conduit and then detecting the position of the radioactive source and thereby the branch conduit from within the liner. It will be appreciated that the prior proposals for determining the port locations in the liner can prove expensive, lengthy and often inconvenient and it is an object of the present invention to alleviate the disadvantages associated with such prior proposals. It is also an object of the present invention to provide an apparatus which can be used to determine, with reasonable accuracy, the location at which a port should be cut within a liner. A further object is to provide a carrier which can be used within a fluid conduit to facilitate positioning of a particular service on that carrier.

STATEMENTS OF INVENTION AND ADVANTAGES

According to the present invention there is provided a method of lining a main fluid conduit having a branch conduit which comprises positioning within the branch conduit a locating means having an extendible part, extending said extendible part to retain said locating means in engagement with the branch conduit; providing within the main fluid conduit a tubular liner; inserting within the tubular liner detecting means which is responsive to said locating means and manoeuvring said detecting means to locate said locating means and from said location cutting through the liner wall from within the liner to form a port which substantially coincides with the branch conduit. It is preferred that by said method the locating means is positioned within the branch conduit by insertion therein from a position within the main fluid conduit. It is also preferred that the extendible part is extendible by means from within the main fluid conduit.

Further according to the present invention there is provided apparatus for use in the method as specified in the immediately preceding paragraph which comprises a carrier displaceable longitudinally within the main fluid conduit and carrying the locating means; displacement means for displacing the locating means laterally relative to the carrier to position the locating means within the branch conduit, and means for extending the extendible part of the locating means for retaining the locating means in engagement with the branch conduit.

Still further according to the present invention there is provided a main fluid conduit having a lining provided by the method as specified in the preceding penultimate paragraph.

The invention also provides a carrier for displacement longitudinally along a fluid conduit and which carrier comprises a body part; a portion on said body part mounted for rotation relative thereto about a longitudinal axis; drive means for controlling rotation of said portion; laterally extendible displacement means mounted on said portion of the carrier for carrying service means, and means for controlling lateral displacement of the displacement means so that, by controlled longitudinal displacement of the carrier, rotation of said portion and lateral displacement of the displacement means, such service means as may be carried by the displacement means can be manoeuvred to a desired position relative to said fluid conduit. The service means which may be carried on the displacement means of the carrier may comprise a locating means as aforementioned which is to be inserted in a branch conduit by the method of the present invention; alternatively, the service means may comprise a cutter device such as a water jet cutter as may be required to be inserted into the bore of a branch conduit from the main fluid conduit for the purpose of cutting the wall of that branch conduit. As a further possibility the service means may be in the form of a seal or plug which is required to be inserted within the branch conduit; for example, the seal may comprise a chamber which is to be expanded under fluid pressure within the branch conduit to provide a seal between that conduit and a port in a plastics liner so that when an infill material (such as grouting) is pumped between the main conduit and the liner such material is restrained by the seal from entering the branch conduit or the bore of the liner through the port.

By the proposal for providing a lining a main fluid conduit in accordance with the present invention it is envisaged that, prior to the liner being positioned within the main conduit, a locating means will be positioned in the or each branch conduit, preferably by insertion of the locating means from the main conduit into the branch conduit by use of a carrier as mentioned above. With the locating means appropriately positioned within the branch conduit, the extendible part of that means is extended to abut and retain the locating means within the branch conduit. Preferably the extendible part of the locating means is extendible by the admission of fluid under pressure into an expandable chamber thereof. The fluid which is admitted into the expandable chamber is preferably air but may be a liquid. The fluid will usually be admitted by way of a non-return valve from a hose on the carrier. It is preferred that the hose through which fluid is admitted to the expandable chamber of the locating means is automatically detachable from such means when the extendible part is adequately expanded to be firmly retained in the branch conduit; this latter detachment is conveniently achieved by the hose "blowing-off" from a non-return valve or nozzle on the locating means so that the latter can be isolated in the branch conduit. Preferably the expandable chamber of the locating means is toroidal such as an elastomeric inner tube of a vehicle tire. The locating means will comprise a source to which the detecting means is responsive. This source may be radioactive. However, because of the hazards generally attributed to the use of radioactive sources, it is preferred that the source on the locating means is of a generally passive nature, for example a metal body which is capable of being sensed by a metal detector within the liner. A further possibility is for the source to be a magnet which may be appropriately detected from within the liner. The source can also be electrical transmitter which can be detected by an appropriate receiver from within the liner.

Preferably the locating means as a whole is generally tubular or comprises fluid flow passages so that when fitted within the branch conduit, fluid flow communication is maintained from the branch conduit through the locating means to the main fluid conduit; in this way it is possible for locating means to be positioned within the branch conduits well ahead of the time at which the main conduit is fitted with its liner so that, until the latter occurs, fluid flow is permitted through the branch conduits without interruption to the users of those conduits.

For the purpose of manoeuvring the locating means to position such means in the branch conduit it is preferred that the displacement means which carries the locating means on the carrier can be rotated about the longitudinal axis along which the carrier will be displaceable within the main fluid conduit so that by appropriate rotation and longitudinal displacement of the displacement means, the locating means can be aligned with a branch conduit opening positioned around the fluid conduit (bearing in mind that, in sewers, branch conduits are usually found in the upper 300° arc of the peripheral wall of the sewer). The displacement means may be of any convenient laterally extendible form such as a scissors-type linkage, a fluid pressure operated ram or a lever and gear system on which the locating means may be detachably carried or on which another service means may be carried.

Following the positioning of the locating means and liner, a carrier with an appropriate detecting means for sensing the locating means will be displaced longitudinally within the liner and the detecting means manoeuvred longitudinally and by rotation (for example in a similar manner to that in which the locating means may be manoeuvred during its insertion into the branch conduit) until a maximum signal is sensed from the locating means which is indicative that the position of the locating means and thereby the branch conduit has been determined. In this position, the wall of the liner may be appropriately marked internally for subsequent cutting or the detecting means may have associated therewith a rotary cutter similar to that disclosed in our British Pat. No. 2,098,300B with particular reference to FIG. 4 thereof. Following the determination and cutting of a port in the liner, the locating means is preferably removed from the branch pipe—especially if the locating means blocks the branch pipe. Where the locating means includes a chamber which is expandable under fluid pressure, such means may be removed, during or following the cutting of the port, by bursting the chamber to reduce the overall size of the locating means and allowing the locating means to fall through the port into the bore of the liner. Conveniently the chamber is burst by cutting through the wall of that chamber with water cutting jets, possibly simultaneously with the cutting of the port in the liner.

If it is likely that the wall of the liner will be at a considerable spacing from the position of the locating means within the branch conduit, then the source which is to be detected on the locating means can be supported, for example by spring means which project into the main fluid conduit, so that such source is nearer to the wall of the liner—thereby facilitating its detection. The spring means by which the source may be carried as aforementioned if a convenient means of permitting the source to be deflected temporarily should it prove necessary to facilitate the manoeuvring of the liner along the main fluid conduit.

The carrier is conveniently in the form of a sledge although it may be mounted on other forms of runners, rollers or wheels to be pulled in controlled manner by a hawser or otherwise driven through the tubular lining.

The present invention was primarily developed for use in connection with sewer conduits or pipes, however, it will be realised that it may be used with advantage in connection with other fluid conduits such as gas or water piping.

DRAWINGS

Embodiments of the present invention will now be described by way of example only, with reference to the accompanying illustrative drawings in which:

FIG. 1 is a longitudinal section through a main sewer pipe having a branch pile extending therefrom and which illustrates a known means for cutting away an internal projection of the branch pipe;

FIG. 2 is a similar section to that shown in FIG. 1 and illustrates a carrier in the main sewer positioning a locating means within the branch pipe;

FIG. 3 is a perspective view, in part section, of the locating means which is positioned in the branch pipe as shown in FIG. 2;

FIG. 4 is a similar section to that of FIG. 2 and shows the main sewer pipe fitted with a liner and a port being cut in the liner to coincide with the branch pipe;

Figure 7:
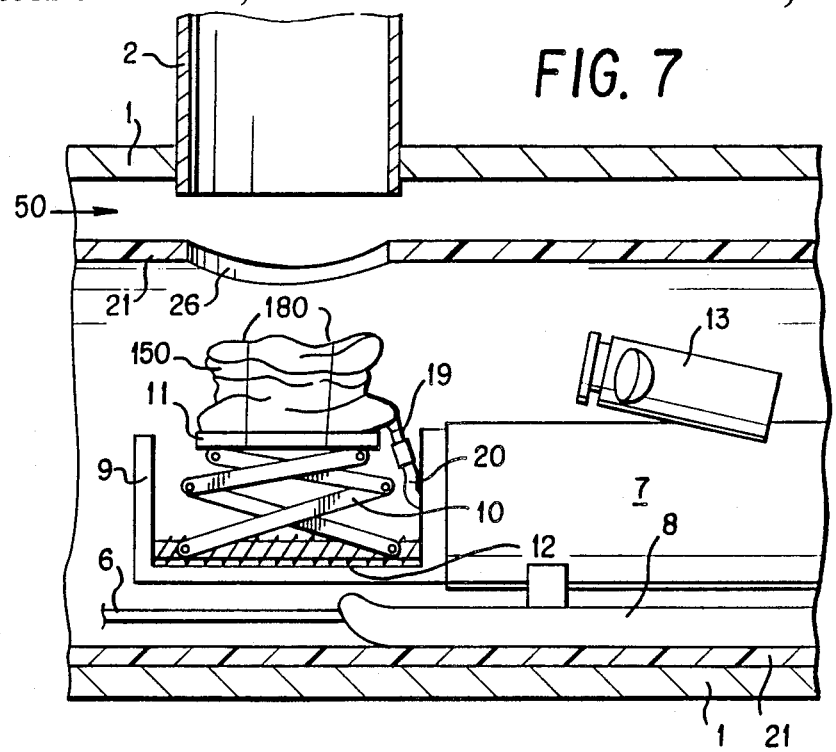
Figure 8:
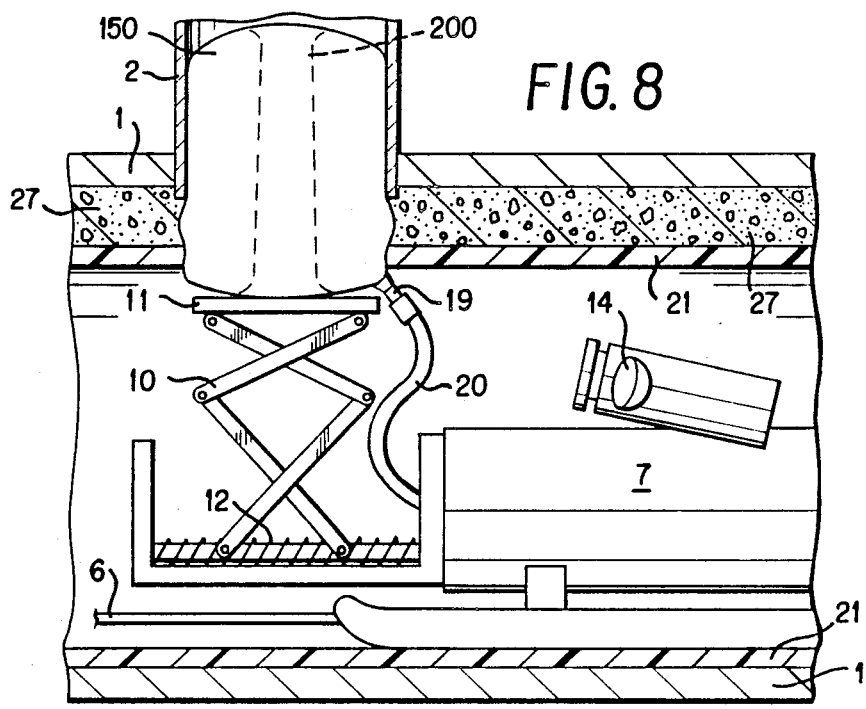

FIG. 7 is a longitudinal section through a main sewer pipe with a branch pipe connection and having a tubular liner in a port of which an expandable seal is to be fitted from a carrier within a tubular liner, and FIG. 8 is a similar view to that shown in FIG. 1 and illustrates the expandable seal fitted within the port and branch pipe and expanded to retain grouting within a space formed between the tubular liner and the main sewer pipe.

DETAILED DESCRIPTION OF DRAWINGS

A conventional sewer pipe 1 has extending therefrom a branch pipe. 2. In FIG. 1 the branch pipe 2 has a part 2a which projects into the main sewer 1 to form an obstruction. The sewer 1 is to be provided with a tubular plastics liner and preparatory to the fitting of this liner, the projection 2a is removed by water cutting jets 4 on a known form of carrier 5 which is displaced longitudinally through the main sewer 1 under control of hawsers 6 in accordance with the disclosure in our British Pat. No. 2,098,300B.

Following removal of obstructions from the main pipe 1 and prior to the positioning of the plastics liner therein, a carrier 7 is located within the pipe 1. The carrier 7 is similar in many respects to the carrier 5, being displaceable along the pipe 1 under control of forwardly and aftwardly extending hawsers 6 and having sledge-type base runners 8. The carrier 7 has a portion 9 which extends forwardly of its main body and on which is mounted a scissors-type extendible linkage 10 carrying a platform 11. The linkage 10 is extendible and contractible to displace the platform 11 laterally upon rotation of a screw rod 12 in the appropriate direction by an electric motor (not shown) within the main body of the carrier 7. The portion 9 is rotatable (preferably through 300° to 360°) under control of an electric motor (not shown) in the main body of the carrier 7 about the longitudinal axis along which the carrier is displaceable. Consequently by appropriate control of the hawsers 6 and rotation of the portion 9, the platform 11 can be manoeuvred into lateral alignment or to coincide with the opening in the wall of the pipe 1 to the branch pipe 2. The aforementioned control will usually be achieved remotely in the manner discussed in our previously mentioned British Patent and under observation from a television camera 13 mounted with lights 14 on the carrier 7 (conveniently for rotation in unison with the portion 9).

Carried on the platform 11 is a generally annular locating device 15 which is best seen in FIG. 3. The device 15 comprises a steel ring 16 having a generally concave or trough-shaped outer surface 17 on which is seated an elastomeric tube 18 (similar to the manner in which a vehicle wheel inner tube is mounted on the rim of a conventional wheel hub). The tube 18 has a nozzle 19 which includes a conventional form of non-return valve such as a Schroder type valve through which the tube is inflatable on the ring 16.

The locating device 15 is to be positioned in isolation within the branch pipe 2 as shown in FIG. 2. With this in mind the device 15 is removably mounted on the platform 11 with its tube 18 deflated, the scissors linkage 10 contracted, and with the carrier 7 located at a convenient access position within the pipe 1. When the device 15 is mounted on the platform 11 a hose 20 from the carrier is fitted to the nozzle 19 for the purpose of inflation the tube 18 with air under pressure. With the linkage 10 contracted as aforementioned, the carrier 7 is moved through the sewer 1 and the platform 11 then manoeuvred (by rotation of the portion 9, operation of the linkage 10 and by the hawsers 6) under observation from the television camera 13 so that the device 15 is displaced to be inserted into the branch pipe 2. In this latter position the tube 18 is inflated to abut the side wall of the pipe 2 and be retained within the branch pipe. The linkage 10 is now contracted to withdraw the platform 11 from the device 15 as the latter is held in the branch pipe. The locating device 15 may be adequately retained on the platform 11 during the aforementioned manoeuvres by temporary retaining means, such as spring devices, brackets, rubber bands or other means on the platform which may engage with the ring 16 but will readily dis-engage or break from the ring 16 upon withdrawal of the platform 11 from the device 15 as the latter is firmly held within the branch pipe. The hose 20 is also removed from the nozzle 19 to isolate the locating device 15 within the branch pipe 2, preferably by the hose automatically blowing-off from the nozzle 19 when the tube 18 has been inflated to a predetermined pressure (although the hose may be pulled from the nozzle as the carrier 7 is displaced along the main pipe 1 away from the branch pipe 2).

A tubular plastics liner or sleeve 21 is now positioned within the main sewer pipe 1; this closes the opening between the main and branch pipes. It is therefore necessary to cut an appropriately located port in the wall of the liner 21 to coincide with the branch pipe and consequently to detect the appropriate position for cutting the port. This is achieved by utilising the steel ring 16 of the locating device as a source for a metal detector 22 mounted on a carrier 23 which is displaceable through the bore of the liner 21 in a similar manner to the carriers 5 and 7. The detector 22 is mounted on a portion 24 of the carrier 23 which is similarly rotatable to the portion 9 of the carrier 7 so that the metal detector 22 can be rotated and manoeuvred longitudinally under control of the hawsers 6 until the strongest signal is achieved from the metal ring source 16 in the branch pipe 2. In this position the detector 22 should be directed towards the branch pipe 2 and a laterally directed rotating nozzle 25 on the carrier portion 24 for water jet cutting (in a similar manner to that discussed in our British Pat. No. 2,098,300B with reference to FIG. 4 thereof) is actuated to cut a port 26 in the liner to coincide with the branch pipe 2. During the cutting of the port 26, the water jet may pierce and thereby deflate the tube 18 so that upon completion of the port cutting, the steel ring 16 of the locating device together with the burst tube 18 may fall into the bore of the liner 21 from which it can be removed. The cutter and detector are not necessarily mounted on the same carrier and, for example, a carrier with a detector can merely locate and mark the position at which a port is to be cut while a further carrier with a cutter is subsequently used to locate the mark and cut the port.

Figure 5:
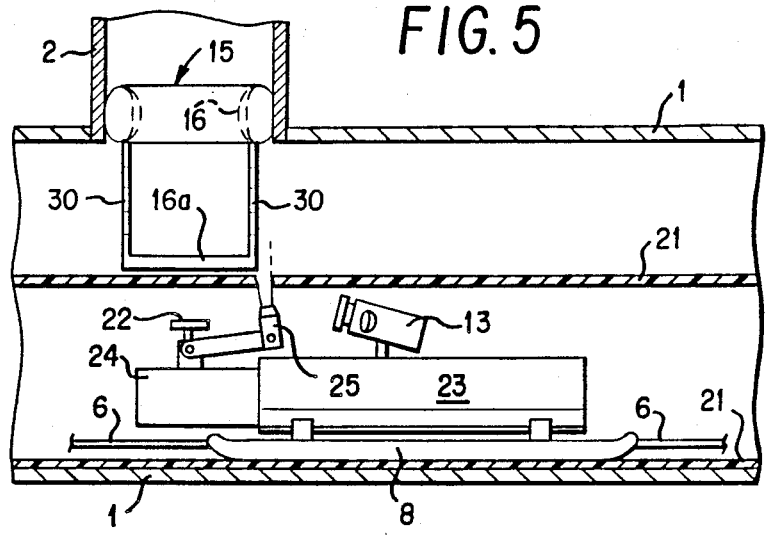
FIG. 5 is a longitudinal section through a main sewer pipe and branch pipe and illustrates a modified form of locating means having a detectable source carried to be positioned adjacent to a relatively small diameter liner within the main sewer.

In the modification shown in FIG. 5, the main sewer pipe 1 is provided with a tubular plastics liner 21 the diameter of which is considerably less than that of the main sewer. In such an arrangement it is possible for the wall of the liner 21 to be at a considerable spacing from the opening to the branch pipe 2. It will therefore be appreciated that with a locating device of the type shown in FIG. 3 fitted within the pipe 2, the metal detector 22 may have to rely upon a very weak signal from the steel ring 16 to determine the appropriate location for cutting a port in the liner 21. To alleviate this difficulty, the locating device 15 which is fitted as shown in FIG. 5 within the branch pipe 2 (in a similar manner to that discussed with reference to FIG. 2) includes a location source such as an annular steel plate 16a which is supported from the steel ring 16 so that it will be located in the vicinity of the wall of the pipe 21 when the latter is fitted The support for the plate 16a is conveniently provided by springs 30 which permit the plate 16a to be deflected should it prove necessary during fitting of the liner 21 and to subsequently return into alignment with the branch pipe 2. The metal detector 22 can now be used to determine the position of the port which is to be cut by the water jet cutter 25 by sensing from the plate 16a.

Figure 6:
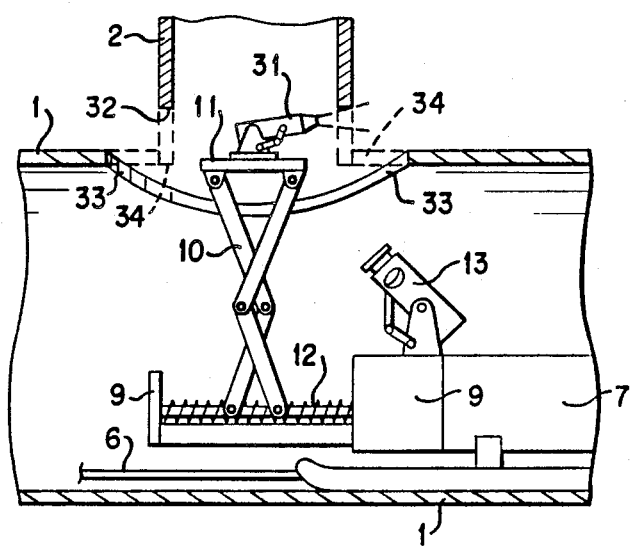
FIG. 6 is a longitudinal section through a main sewer pipe and branch pipe and illustrates a modified form of carrier having a cutter mounted on displacement means of the carrier for the purpose of positioning the cutter within the branch pipe for cutting through the wall thereof.

In the embodiment of FIG. 2, the carrier 7 with its laterally displaceable scissors linkage 10 is utilised for providing the service of positioning the locating device 15 within the branch pipe 2. However, the laterally displaceable part of the carrier can be modified to provide different services, for example to carry a detector or, as shown in FIG. 6, for the platform 11 to carry a rotatable water jet cutting nozzle 31. By appropriate manoeuvring of the platform 11 as previously discussed, the nozzle 31 may be inserted into the branch pipe 2 and rotated to cut through the wall of the pipe 2 circumferentially as indicated at 32. If a generally circular cut 33 is now made through the wall of the main sewer pipe 1 concentric with the branch pipe 2 (for example by use of a rotating cutter such as that shown at 25) it will be apparent that a short pipe section of the branch pipe 2 having a saddle-shaped external flange from the pipe 1 (and as indicated by the broken line 34) may fall into the bore of the pipe 1. Consequently the branch pipe 2 can be isolated from the main sewer pipe 1 so that, for example, if the main sewer pipe 1 is subsequently destroyed with a view to providing a new plastics main sewer, the integrity of the branch pipe 2 will be maintained for subsequent connection to the new main pipe. It will be apparent that to achieve this latter connection and form an appropriate port in the new main pipe (which may then be regarded as a plastics liner extending through a bore in the ground), the procedure discussed with reference to FIG. 2 can be followed to position a locating device within the branch pipe 2.

The locating means is not necessarily in the form of an annular or tubular device such as that shown at 15 in FIG. 3 and may, for example, be in the form of an inflatable bag carrying an appropriate material which is to be sensed by the detecting means. However, the use of a tubular locating device is preferred since it will be apparent from FIG. 2 that when the device 15 is fitted and isolated within the branch pipe 2, fluid flow communication is maintained from the branch pipe to the main pipe 1. The locating devices 15 can therefore be fitted in their respective branch pipes a long time before the plastics liner 21 is fitted without any disruption in the normal use of the branch pipes 2.

The possibility is envisaged of having the locating device (such as an inflatable chamber thereof) formed of or comprising a material which will rapidly degrade or disintegrate when subjected to the fluid which is to flow through the branch pipe; in this way the restriction formed by the locating means may soon be alleviated as the aforementioned material breaks down when normal use of the branch pipe for fluid flow resumes and the debris of the locating means is flushed away.

When the port 26 has been completed, any space 50 which is formed between the wall of the liner 21 and that of the main sewer pipe 1 can be filled with grouting 27 in a manner which will now be discussed with reference to FIGS. 7 and 8. It is of course important to ensure that the grouting 27 is retained within the gap 50 and does not flow to set and form a blockage in the branch pipe 2, port 26, liner 21 or in the communication between the branch pipe and the interior of the liner through the port 26. Prior to grouting, the carrier 7 is displaced along the liner 21 and the platform 11 manoeuvred to be in lateral alignment (or to coincide with) the port 26.

Carried on the platform 11 and initially in a collapsed condition as shown in FIG. 7 is a rubberised canvas bag 150 having a nozzle 19 through which it can be inflated by air under pressure supplied through the hose 20 fitted to the nozzle. The bag 150 is temporarily retained on the platform 11 by elastomeric bands 180. The hose 20 is coupled to an appropriate air pressure source through the carrier 7 while the nozzle 19 includes a simple form of non-return valve.

The scissors linkage 10 is extended to move the bag 150 into the port 26 and possibly part-way into the branch pipe 2. The bag 150 is now inflated to expand within the port 26 and branch pipe 2 as shown in FIG. 8. During expansion of the bag the bands 180 snap and release the bag from the platform 11. When the bag 150 has been sufficiently inflated it grips the side wall of the branch pipe 2 and the edge of the port 26 and forms an effective grouting seal between the port 26 and the branch pipe which bridges the gap 50 as shown in FIG. 8. With the bag thus forming a plug or grouting seal, the grouting 27 can be pumped into the gap 50 to fill that gap and solidify to reinforce and retain the liner 21.

When the bag 150 has been inflated to an appropriate pressure it is preferred that the hose 20 automatically blows-off to disengage from the nozzle 19. It is then merely necessary to contract the scissor linkage 10 to leave the bag 150 isolated within the port 26 and branch pipe 2. In practice the main sewer pipe 1 will usually have a longitudinally spaced array of branch pipes 2 and corresponding ports 4 in its liner 3 and, prior to the grouting process, each of these branch pipes and ports can be fitted with separate inflatable bags 150 in the manner discussed above (by repeatedly moving the carrier 7 along the liner 21 to an appropriate location at which a collapsed bag 150 can be fitted to the platform 11 and thereafter again moving the carrier along the liner to manoeuvre and fit that bag within a port 26).

When the grouting 27 has set the bag or bags 150 can be removed from their respective branch pipes and ports 26, conveniently by bursting each bag and allowing it to deflate and drop into the liner 21 from which it may be collected. The bags 15 may be punctured by cutting through the material of the bag with a water jet cutting device. Should the deflated bag fail to fall freely from the port 26 into the bore of the liner 21 it may simply be hooked, for example by a water nozzle, to be dragged from its port and branch pipe along the interior of the liner.

If required the bag 150 can be tubular when inflated to provide a fluid passage (indicated at 200) which maintains fluid flow communication between the branch pipe 2 and the bore of the liner 21 during the grouting process.

I claim:

1. A method of lining a main fluid conduit having a branch conduit comprising the steps of: positioning within the branch conduit by inserting therein from a position within the main fluid conduit a locating means having an expandable chamber; attaching to the locating means expansion control means communicating with the locating means from within the main fluid conduit; admitting fluid under pressure into the expandable chamber by use of the expansion control means, thereby expanding the chamber and retaining the locating means in the branch conduit; detaching the expansion control means from the locating means; providing a tubular liner within the main fluid conduit; inserting within the tubular liner detecting means for responding to the locating means; maneuvering the detecting means within the liner and locating a position of the locating means by use of the detecting means; cutting through the liner at the position where the locating means is detected, thereby forming a port in said liner which substantially coincides with the branch conduit; removing fluid from the expandable chamber, thereby contacting the chamber; and withdrawing the locating means from the branch conduit through the port and into the liner of the main conduit for removal therefrom.

2. The method as claimed in claim 1 wherein the expansion control means includes a hose and the step of admitting fluid comprises attaching the hose to the locating means and admitting fluid into the expandable chamber from the hose and by way of a non-return valve on the locating means, and said method includes the additional step of detaching the hose from the locating means when the chamber is adequately expanded, thereby retaining the locating means in the branch conduit.

3. The method as claimed in claim 2 wherein said step of detaching comprises automatically detaching the hose from the locating means by increasing the fluid pressure in the expandable chamber to a predetermined pressure, thereby retaining the locating means in the branch conduit and causing the hose to separate from the locating means.

4. The method as claimed in claim 1 wherein the locating means has at least one fluid passage extending therethrough and wherein the step of positioning comprises positioning the locating means within the branch conduit with said at least one fluid passage maintaining fluid flow communication between the branch conduit and the main fluid conduit.

5. The method as claimed in claim 1 wherein the step of positioning comprises maneuvering the locating means longitudinally within the main fluid conduit and rotationally about a longitudinal axis within the main fluid conduit, thereby aligning the locating means with the branch conduit, and displacing the locating means laterally, thereby positioning the locating means within the branch conduit.

6. The method as claimed in claim 1 in which the main fluid conduit has several branch conduits and said step of positioning comprises positioning and retaining in isolation a locating means one within each branch conduit; maneuvering the detecting means, thereby locating the respective locating means from within the liner, and forming ports in the liner which coincide, substantially, with the respective branch conduits.

7. The method as claimed in claim 1 wherein the step of removing fluid from the expandable chamber comprises bursting the expandable chamber, thereby reducing the overall size of the locating means, and withdrawing the locating means from the branch conduit after the step of removing fluid has been performed.

8. The method as claimed in claim 7 wherein the step of cutting through the liner comprises cutting the liner wall with a cutter, and the step of removing fluid comprises bursting the expandable chamber with the cutter.

9. The method as claimed in claim 1 including the additional steps of maneuvering within the liner a carrier carrying sealing means including an expandable sealing chamber for sealing the port and the branch conduit; displacing the sealing means on the carrier laterally through the port to extend into the branch conduit; admitting fluid under pressure into the expandable sealing chamber, thereby expanding the sealing chamber and sealing the port and the branch conduit; and filling the space between the main conduit and the liner with grouting while the port and the branch conduit are sealed by the sealing means.

* * * * *